(12) United States Patent
Xu et al.

(10) Patent No.: US 10,926,175 B2
(45) Date of Patent: Feb. 23, 2021

(54) SYSTEMS AND METHODS FOR REDUCING IMPACT OF NETWORK DISRUPTIONS

(71) Applicant: Peerless Media Ltd., Gibraltar (GI)

(72) Inventors: Langfeng Xu, Wuxi (CN); Huaipeng Yan, Beijing (CN)

(73) Assignee: Peerless Media Ltd., Gibraltar (GI)

( * ) Notice: Subject to any disclaimer, the term of this patent is extended or adjusted under 35 U.S.C. 154(b) by 124 days.

(21) Appl. No.: 15/635,442

(22) Filed: Jun. 28, 2017

(65) Prior Publication Data

US 2018/0001197 A1 Jan. 4, 2018

(30) Foreign Application Priority Data

Jun. 29, 2016 (CN) .......................... 2016 1 0661901

(51) Int. Cl.
| | | |
|---|---|---|
| A63F 13/49 | (2014.01) | |
| G07F 17/32 | (2006.01) | |
| A63F 13/358 | (2014.01) | |
| A63F 13/79 | (2014.01) | |

(Continued)

(52) U.S. Cl.
CPC ............ *A63F 13/49* (2014.09); *G07F 17/323* (2013.01); *G07F 17/326* (2013.01); *G07F 17/3218* (2013.01); *G07F 17/3258* (2013.01); *G07F 17/3269* (2013.01); *G07F 17/3272* (2013.01); *G07F 17/3276* (2013.01); *G07F 17/3293* (2013.01); *A63F 13/358* (2014.09);
(Continued)

(58) Field of Classification Search
CPC ............... G07F 17/326; G07F 17/3269; G07F 17/3276; G07F 17/3293; G07F 17/3272

USPC ....................................................... 463/13, 42
See application file for complete search history.

(56) References Cited

U.S. PATENT DOCUMENTS 5,768,382 A     6/1998   Schneier
5,779,549 A *   7/1998   Walker ..................... A63F 13/12
                                                         463/23
6,244,958 B1    6/2001   Acres
(Continued)

FOREIGN PATENT DOCUMENTS

WO          0067424       11/2000
WO       2006036100 A1     4/2006
(Continued)

OTHER PUBLICATIONS

Roman V. Yampolskiy, "Detecting and Controlling Cheating in Online Poker," accessed on May 26, 2016, University at Buffalo, Buffalo, New York (6 pages).

*Primary Examiner* — Chase E Leichliter
(74) *Attorney, Agent, or Firm* — Beem Patent Law Fim (57) ABSTRACT

The negative impact of network disruptions in electronic games may be reduced by providing increased efficiency in network communications and client- and server-side processing when a player rejoins a game in progress. In some embodiments, an electronic game system may generate a list of games, such as a poker tournament, for which a player is registered. A client application may provide the list as part of a user interface through which the player may directly rejoin a listed game upon selection of a currently in-progress game from the list. In addition, the system may establish one or more mandatory break periods in certain extended game types such as tournaments. The mandatory break period may be the same time for all extended game types. Other implementations also are described.

11 Claims, 8 Drawing Sheets

(51) Int. Cl.
*A63F 13/792* (2014.01)
*A63F 13/822* (2014.01)

(52) U.S. Cl.
CPC ............ *A63F 13/79* (2014.09); *A63F 13/792* (2014.09); *A63F 13/822* (2014.09)

(56) References Cited

U.S. PATENT DOCUMENTS

| | | | |
|---|---|---|---|
| 7,380,795 B2 * | 6/2008 | Novellie | A63F 3/00157 273/274 |
| 8,047,909 B2 * | 11/2011 | Walker | G07F 17/32 463/16 |
| 8,500,553 B2 | 8/2013 | Olomskiy | |
| 8,960,676 B2 | 2/2015 | Costa | |
| 8,992,319 B1 | 3/2015 | Pascal et al. | |
| 9,050,530 B2 | 6/2015 | Sivak | |
| 9,101,833 B2 | 8/2015 | Behmaram-Mosavat et al. | |
| 9,211,474 B2 | 12/2015 | Wilkinson et al. | |
| 9,216,358 B2 | 12/2015 | Hess et al. | |
| 10,068,425 B2 * | 9/2018 | Colvin | G07F 17/3272 |
| 10,453,300 B2 * | 10/2019 | Colvin | G07F 17/3293 |
| 2002/0107072 A1 | 8/2002 | Giobbi | |
| 2003/0070178 A1 * | 4/2003 | Boyd | G07F 17/32 725/110 |
| 2003/0216168 A1 | 11/2003 | Cannon | |
| 2003/0216968 A1 | 11/2003 | Barnhart | |
| 2004/0005919 A1 | 1/2004 | Walker et al. | |
| 2004/0077408 A1 | 4/2004 | D'Amico et al. | |
| 2004/0132521 A1 * | 7/2004 | Peterson | A63F 13/12 463/16 |
| 2004/0162132 A1 | 8/2004 | Jaffe | |
| 2004/0176167 A1 | 9/2004 | Michaelson et al. | |
| 2006/0052168 A1 | 3/2006 | Shacham | |
| 2006/0160612 A1 | 7/2006 | Parham et al. | |
| 2006/0175758 A1 | 8/2006 | Riolo | |
| 2006/0183526 A1 * | 8/2006 | Verardi | G07F 17/32 463/13 |
| 2006/0194628 A1 * | 8/2006 | Novellie | G07F 17/32 463/13 |
| 2006/0287067 A1 | 12/2006 | White et al. | |
| 2006/0287103 A1 * | 12/2006 | Crawford, III | G07F 17/32 463/42 |
| 2007/0232398 A1 | 10/2007 | Aikin et al. | |
| 2007/0270211 A1 | 11/2007 | Moshal | |
| 2008/0026816 A1 | 1/2008 | Sammon | |
| 2008/0026826 A1 * | 1/2008 | Groswirt | G07F 17/32 463/25 |
| 2008/0070659 A1 | 3/2008 | Naicker | |
| 2008/0146351 A1 * | 6/2008 | Packes | G07F 17/32 463/47 |
| 2008/0194334 A1 | 8/2008 | Kuok et al. | |
| 2008/0318651 A1 * | 12/2008 | Gross | G07F 17/3227 463/13 |
| 2009/0121438 A1 * | 5/2009 | Gustafsson | A63F 1/00 273/303 |
| 2009/0253516 A1 * | 10/2009 | Hartmann | G07F 17/32 463/42 |
| 2010/0120490 A1 | 5/2010 | McLaughlin et al. | |
| 2010/0227675 A1 | 9/2010 | Luxton et al. | |
| 2010/0227691 A1 * | 9/2010 | Karsten | G07F 17/32 463/42 |
| 2010/0273545 A1 * | 10/2010 | Salonen | G07F 17/32 463/11 |
| 2010/0285859 A1 * | 11/2010 | Costa | G07F 17/3293 463/13 |
| 2011/0045909 A1 | 2/2011 | Cole | |
| 2011/0105208 A1 * | 5/2011 | Bickley | G07F 17/32 463/13 |
| 2011/0177863 A1 * | 7/2011 | Davidson | G06Q 90/00 463/29 |
| 2013/0029739 A1 | 1/2013 | Ramsey et al. | |
| 2013/0296036 A1 * | 11/2013 | Scott | G07F 17/32 463/26 |
| 2014/0045589 A1 * | 2/2014 | Paradise | A63F 13/00 463/29 |
| 2014/0194199 A1 | 7/2014 | DiGiovanni | |
| 2015/0031431 A1 * | 1/2015 | Burnside | G07F 17/3293 463/13 |
| 2015/0072747 A1 * | 3/2015 | Burnside | G07F 17/3293 463/13 |
| 2015/0119137 A1 * | 4/2015 | Alexander | G07F 17/3293 463/29 |
| 2015/0221183 A1 * | 8/2015 | Colvin | G07F 17/3293 463/11 |
| 2015/0248814 A1 | 9/2015 | Ottofy | |
| 2015/0254936 A1 | 9/2015 | Stuppler | |
| 2016/0071369 A1 | 3/2016 | Graves et al. | |
| 2016/0093169 A1 | 3/2016 | Orcutt | |
| 2016/0199732 A1 * | 7/2016 | Baker | A63F 13/35 463/29 |
| 2017/0124804 A1 | 5/2017 | Nelson et al. | |

FOREIGN PATENT DOCUMENTS

| | | |
|---|---|---|
| WO | 2007085054 A1 | 8/2007 |
| WO | 2014128735 A1 | 8/2014 |

* cited by examiner

*Fig.9C* under the following claims, as well as their equivalents.
SYSTEMS AND METHODS FOR REDUCING IMPACT OF NETWORK DISRUPTIONS

RELATED APPLICATIONS

This application claims priority from Chinese Patent Application No. 201610661901.4 filed Jun. 29, 2016, which is incorporated by reference in its entirety.

BACKGROUND OF THE INVENTION

1. Technical Field

This application is directed to the field of reducing the negative impact of a network disruption, and more particularly to increasing efficiency in network communications and client-side processing when a player rejoins a session in progress following a network disruption.

2. Related Art

The "freemium" (free+premium) model allows developers to generate revenue on their products while each end user is able to choose how much, if any, money she spends on the product. Usually, freemium products operate by implementing some form of in-game virtual currency. Virtual currency is an in-product item that has value in the product, but not in the real world. The virtual currency may have value in the game, for example, because it may be used to enhance the player's abilities, modify actions in the game, purchase other virtual items in the game such as appearance items or the like. In the case of games that involve betting or gambling, virtual currency may be wagered.

End users, or players, may earn virtual currency in a few different ways.

For example, a game may provide virtual currency to a player if she completes certain tasks or activities in the game, such as playing the game a certain number of times, achieving a particular score, and the like. The game also may issue virtual currency as a bonus gift to the player based on various pre-determined parameters. Some games allow end users to purchase virtual currency using actual currency. If the virtual currency is used as a bet or wager, the end user may earn additional currency if she wins the bet or wager.

Electronic poker games often use virtual currencies as the base currency of the game, poker chips. Many of these games offer poker tournaments that allow a large number of players to participate for even larger pools of chips over multiple rounds (and hours or even days) of poker. Tournaments offer the chance for players to win large amounts of chips without risking many chips of their own. Tournaments also provide opportunities for strategies different from those that may be employed in a typical game and test the player's stamina.

While tournaments offer a lot of excitement and potential winnings, they also require a big commitment from not only the player—both in terms of time and focus—but also the player's network connection. Often, the player's final placing may be determined by a small number of hands. If the player is fatigued or if a network disruption occurs during these critical times, the player's tournament run may come to a crashing halt, quite literally.

Accordingly, a need has long existed for improved systems and methods that solve the technical problems associated with rejoining games-in-progress following a network disruption in electronic games and providing a meaningful break for players participating in concurrent games.

SUMMARY

The negative impact of network disruptions in electronic games may be reduced by providing increased efficiency in network communications and client- and server-side processing when a player rejoins a game in progress. In some embodiments, an electronic game system may generate a list of games, such as a poker tournament, for which a player is registered. A client application may provide the list as part of a user interface through which the player may directly rejoin a listed game upon selection of a currently in-progress game from the list. In addition, the system may establish one or more mandatory break periods in certain extended game types such as tournaments. The mandatory break period may be the same time for all extended game types. In some embodiments, non-mandatory breaks also may be established. Other implementations also are described.

Other systems, methods, features, and technical advantages of the invention will be, or will become apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the contact management system architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the communications architecture will be described, methods, systems, and articles of manufacture consistent with the contact management system architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems.

Figure 1:
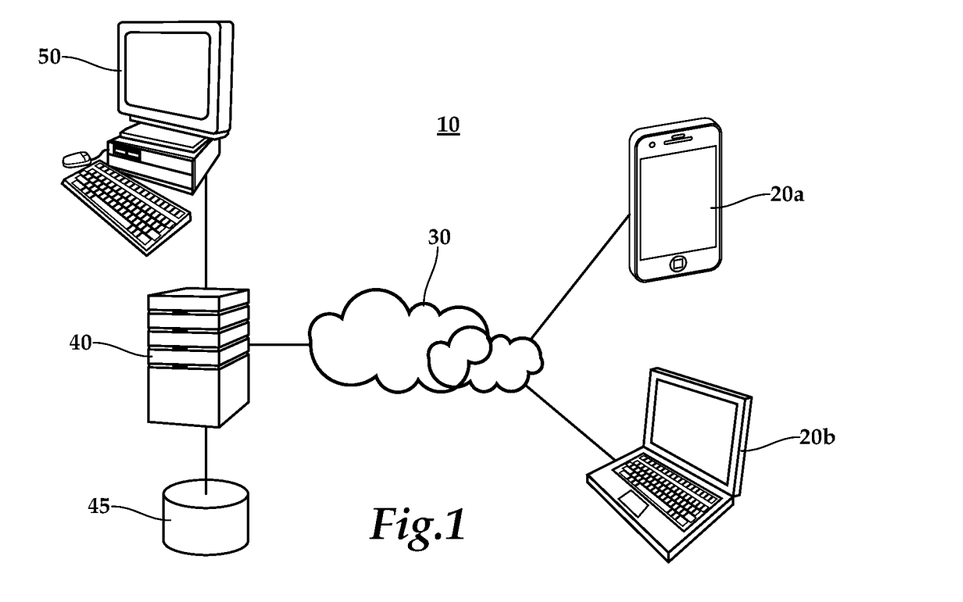
FIG. 1 shows an exemplary physical architecture for an exemplary system for providing an electronic game having a virtual currency.

As shown in FIG. 1, an exemplary architecture 10 for a system for providing an electronic game having one or more virtual currencies is shown. One or more devices may run client applications 20a and 20b which may communicate with a game server 40 via a communications network 30. The client devices 20a may provide an interface to the user or player and provide game data to the game server 40. In response, the game server 40 may interpret that game data and issue new game data to the client devices 20a and 20b. The game server 40 may store information in one or more databases 45 and also may provide an administrative interface 50 that enables an administrator to interact with the server 40, for example, to create tournaments.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, the game server may be implemented as a single server configured to provide all of the systems functionalities, or the functionalities may be implemented across multiple servers.

The client applications 20a and 20b may provide a user interface for the system and may communicate device specific information, user profile information, game data and other information with game server 40 via communications network 30. In one embodiment, client applications 20a and 20b may comprise stand-alone applications which may be either platform dependent or platform independent. For example, client applications 20a and 20b may be stand-alone applications for a mobile phone configured to run on a mobile operating system such as the iOS™ operating system from Apple Inc. located in Cupertino, Calif., the Android™ operating system from Google, Inc. located in Mountain View, California, or the like. Alternatively, or additionally, client applications 20a and 20b may connect to the game server 40 via the Internet using a standard browser application. Alternatively, or additionally, one or more of the client applications 20a and 20b may be an application configured to run on mobile computer such as a laptop computer, handheld computer, tablet, mobile messaging device, or the like which may all utilize different hardware and/or software packages. Other methods may be used to implement the client devices 20a and 20b.

The communications network 30 may be any type any private or public communication network, such as the Internet, and may include one or more communications networks. In some embodiments, the communications network 30 may be a cellular network such as, for example, a Code Division Multiple Access (CDMA) network, Global System for Mobiles (GSM) network, General Packet Radio Service (GPRS) network, cdmaOne network, CDMA2000 network, Evolution-Data Optimized (EV-DO) network, Enhanced Data Rates for GSM Evolution (EDGE) network, Universal Mobile Telecommunications System (UMTS) network, Digital Enhanced Cordless Telecommunications (DECT) network, Digital AMPS (IS-136/TDMA), Integrated Digital Enhanced Network (iDEN), Long-Term Evolution (LTE) and the like.

The game server 40 may store game data, user profile information and related information in a database 45, receive game data, device data, and user profile information from a client application 20a and 20b, implement game logic, provide a user interface for an administration interface 50, and the like. As should be apparent to one of ordinary skill in the art from the disclosure herein, other related services may also be provided.

The database 45 may store a variety of information, including user profile information, user preference information, game data, tournament data, and the like. In some embodiments, all information stored in the database 45 is encrypted.

Exemplary Tournament Poker Games Using Virtual Currency

Although reference will now be made to certain embodiments described herein with reference to a poker game, the principles presented herein may be used for other games, such as black jack, roulette, slots and the like. In addition, the embodiments presented here may also be used in non-casino games that use virtual currencies. The embodiments illustrated herein should therefore not be interpreted to be exclusive or limiting, but rather exemplary or illustrative.

Figure 2:
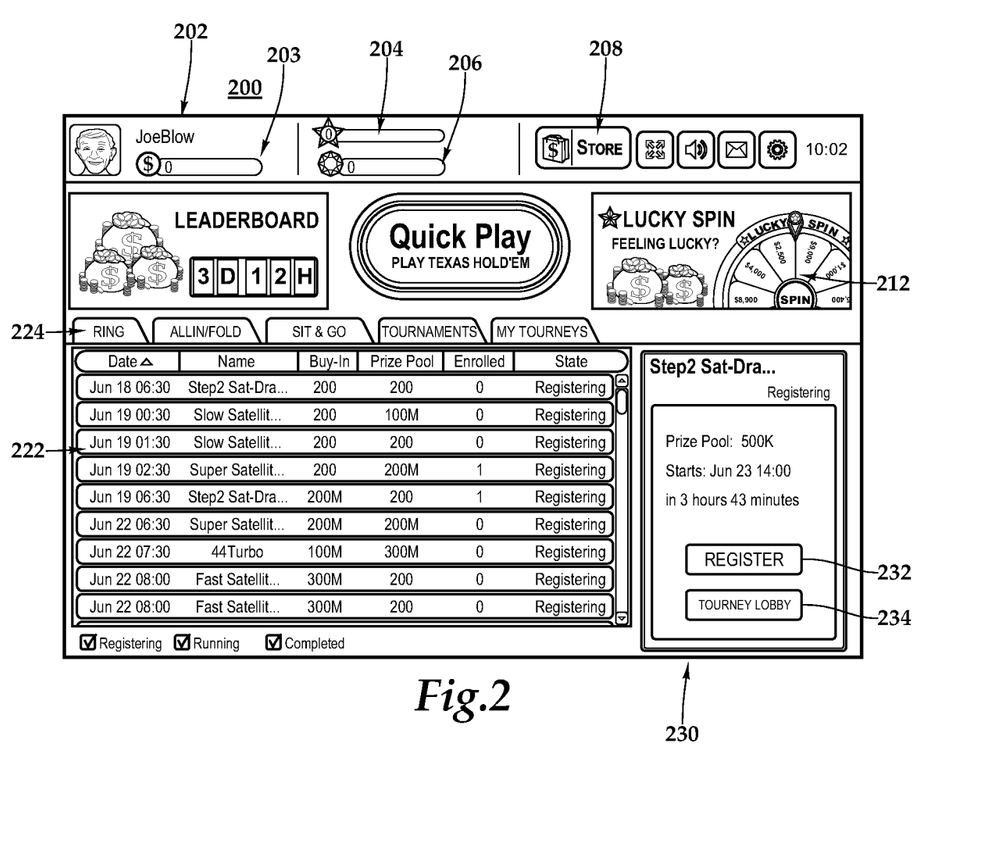
FIG. 2 shows an exemplary screen shot of a main poker tournament lobby.

Referring to FIG. 2, an exemplary screen shot of a main poker tournament lobby is shown. Upon logging in to the server 40, the client application 20a may present the player with a main lobby 200 from which the player may register for a variety of games 224. Exemplary games may include ring games (or cash-in games) that may be segmented into casual or high-stakes game types, all-in or fold game types, sit-and-go game types (which may offer scaled down tournament type play) and tournament game types. In the illustrated embodiment, a list of available tournaments 222 may be displayed along with certain game type information, such as a buy-in, number of total participants, number of available slots, tournament status (such as registration mode, in-progress or completed) and the like. Selection of a tournament from the list 222 may cause additional information to be displayed in a tournament detail display section 230, which also may provide interface controls 232 and 234 that allow the player to register for the selected tournament or view the additional information about the tournament in a tournament lobby, respectively.

In the embodiment illustrated in FIG. 2, the main lobby 200 may include player indicia 202 that shows the player's name, chip indicia 203 that shows the player's current chip count, level indicia 204 that shows the player's current level (e.g. a numerical representation corresponding to a total number of experience points earned for performing in-game actions), and reward point indicia 206 that shows the player's current reward point total.

Figure 3A:
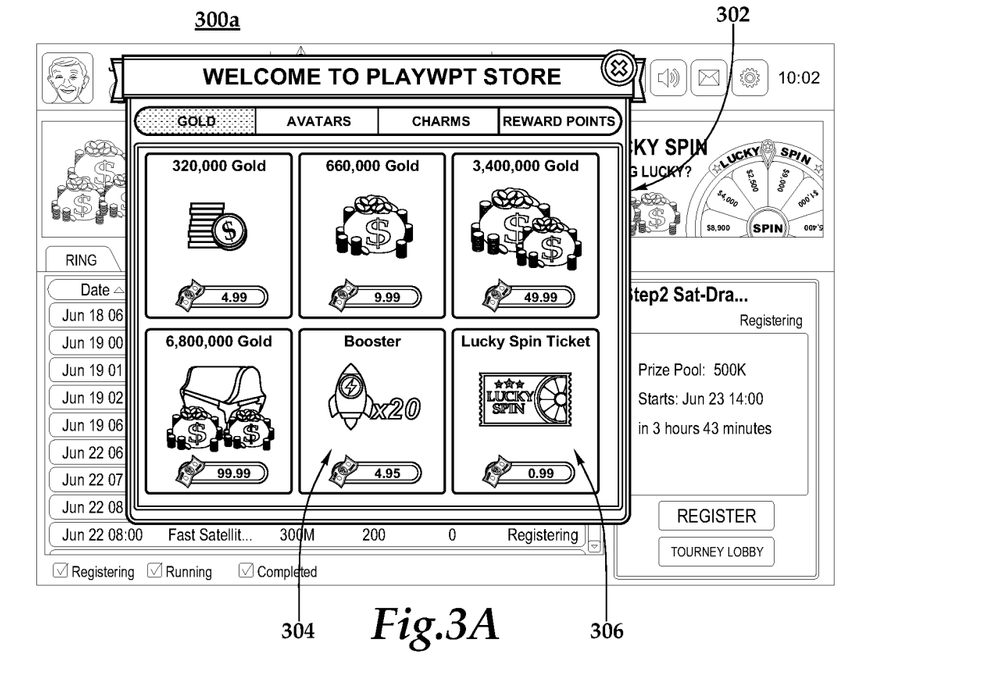
FIGS. 3*a*-3*d* show exemplary screen shots of a virtual currency storefront.

In addition, the main lobby 200 may provide an interface control 208 that, upon selection by the user, presents the user with the opportunity to purchase various in-game items. Referring also to FIGS. 3*a*-3*d*, exemplary screen shots 300*a*-300*d* of a virtual currency storefront is shown. As shown in FIG. 3*a*, a user may purchase one or more virtual currencies using actual money. In the illustrated embodiment, the user may purchase gold chips 302 that may be used to wager in electronic poker games and purchase other in-game items (as described below and shown in FIGS. 3*b* and 3*c*), a booster 304 that may increase virtual currency rewards earned by performing in-game actions such as mini-games, and a lucky spin ticket 306 that may grant the user a chance to win virtual currency through a lucky spin mini-game 212.

Figure 3B:
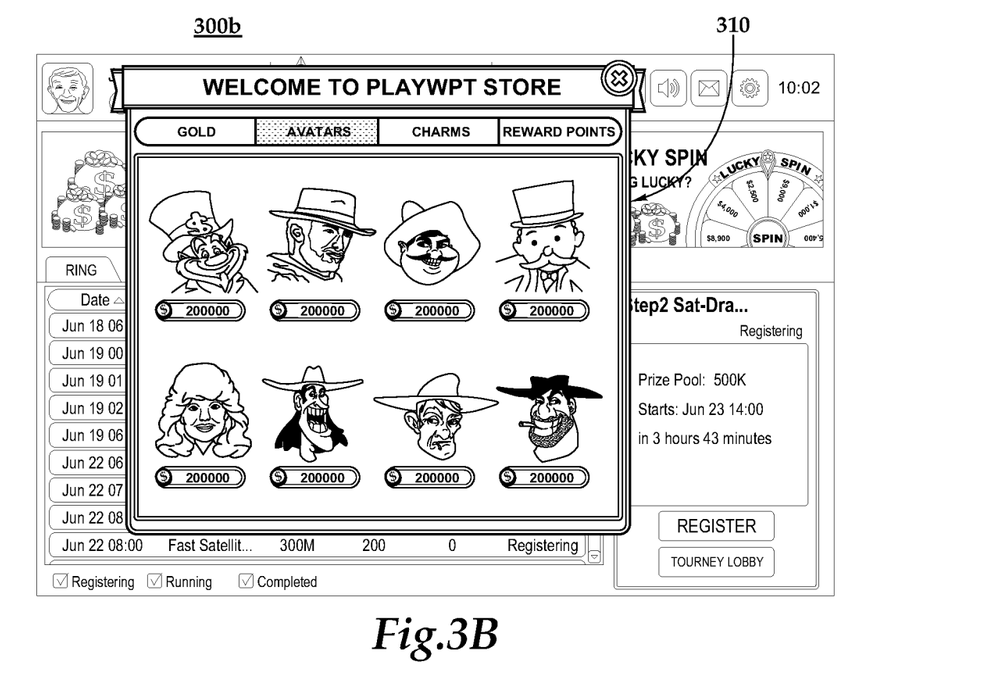
Figure 3C:
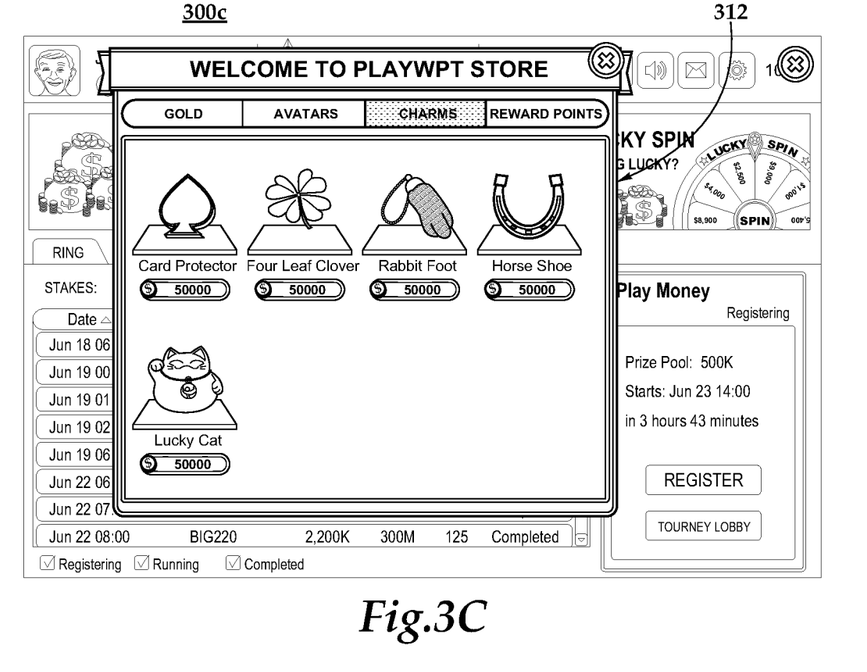
Figure 3D:
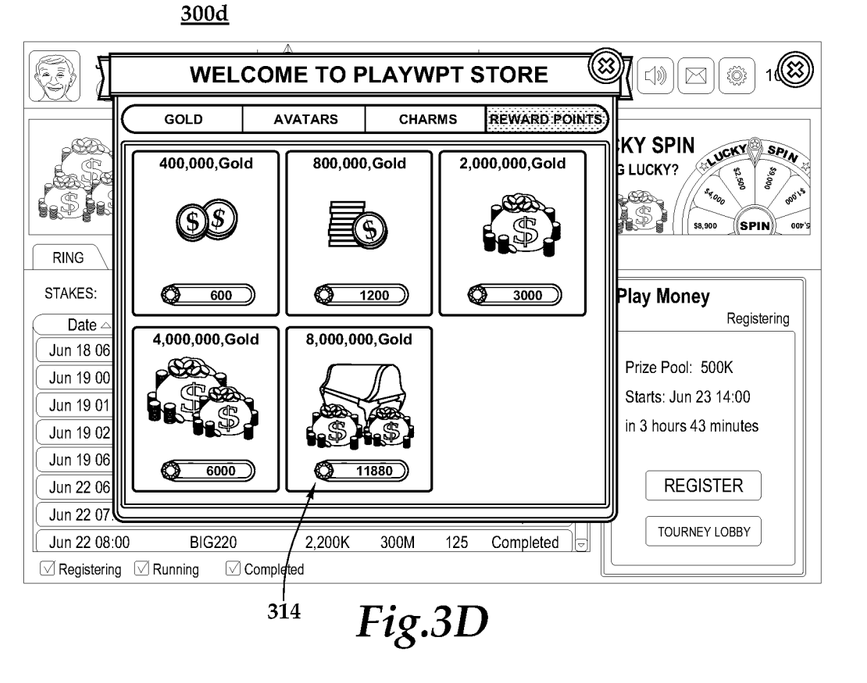

In some embodiments, the user may be able to purchase additional in-game items using one or more of the virtual currencies. For example, a user may purchase avatars 310 (as shown in FIG. 3*b*) and charms 312 (as shown in FIG. 3*c*) using gold coins. Avatars 310 may be icons, 3-D cartoon characters or other images that act as visual representations of the user in the game. In some embodiments, a user may be given a default avatar, such as a dark silhouette. Charms 312 may be objects that are traditionally associated with good luck, such as a rabbit's foot, horse shoe, four leaf clover and the like. In some embodiments, a player may be able to transfer a charm 312 to other players. Charms 312 may be permanent, i.e. do not expire. Finally, in some embodiments, players may be able to purchase gold coins 302 using reward points 314.

Tournament Registration

Referring to FIGS. 2 and FIG. 4*a*-*d*, exemplary screen shots for showing various screens of an interface that may allow a user to register for a tournament are shown. As noted above, the main tournament lobby 200 may display a list of available tournaments 222 along with certain game type information, such as a buy-in, number of total participants, number of available slots, tournament status (such as registration mode, in-progress or completed) and the like. Selection of a tournament from the list 222 may cause additional information to be displayed in a tournament detail display section 230, which also may provide interface controls 232 and 234 that allow the player to register for the selected tournament or view the additional information about the tournament in a tournament lobby, respectively.

Figure 4A:
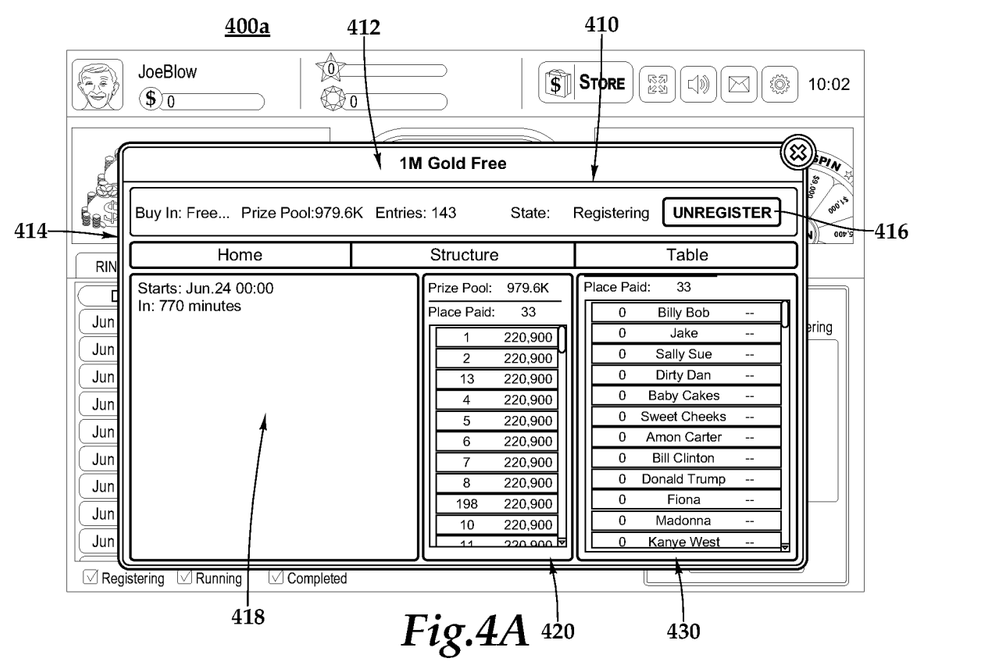
FIGS. 4*a*-4*d* show exemplary screen shots of interface displays associated with viewing information about tournaments and registering for a selected tournament.
Figure 4B:
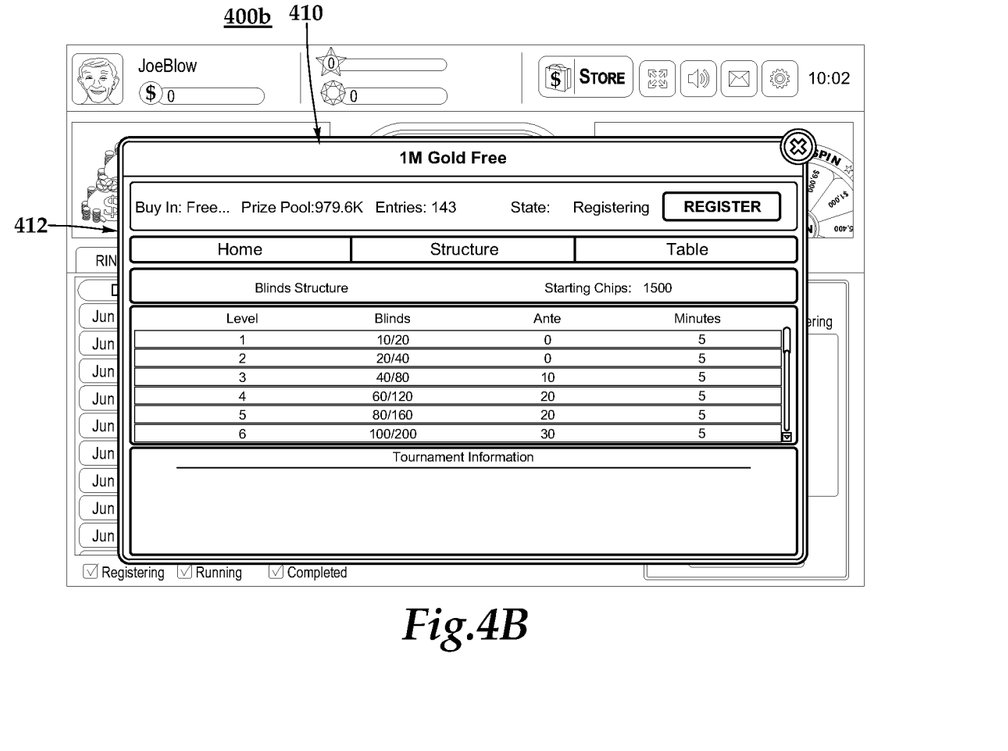

FIG. 4*a* shows an exemplary screen shot 400*a* of a tournament lobby 410. In the illustrated embodiment, the tournament lobby 410 may include a tournament title 412, general tournament information 414, and an interface control to register 416 or unregister for the tournament. The general tournament information 414 may include a buy-in amount, total prize pool, number of entries and state of the tournament. A series of tabs may provide additional information about the tournament. The home tab may display a tournament start time 418, a prize payout structure 420, and a list of players 430. As shown in the exemplary screenshot 400*b* shown in FIG. 4*b*, the structure tab may display the tournament structure, such as a starting number of chips and a number of tournament levels and the blinds and/or ante amounts required at each level. A level duration also may be displayed.

Figure 4C:
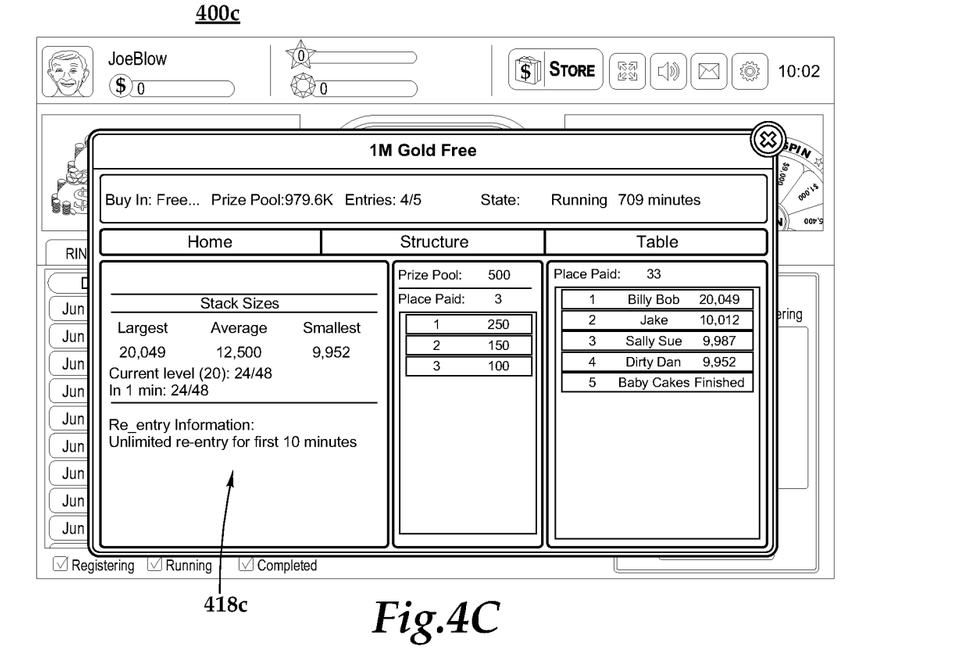
Figure 4D:
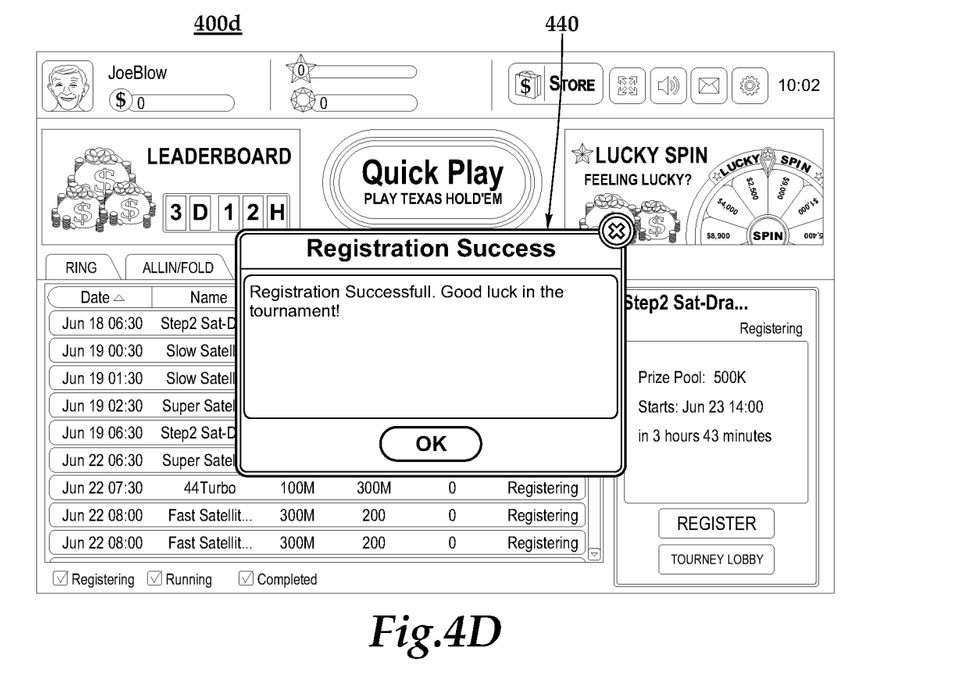

As shown in the exemplary screenshot 400*c* shown in FIG. 4*c*, different information may be provided when a tournament is in progress. For example, in the illustrated embodiment, the home tab displays current tournament information 418*c* such as statistics like the largest chip stack, average chip stack and smallest chip stack. The current level of the tournament and associated blinds and/or antes also may be displayed, as well as re-entry information. Other information also may be provided.

Figure 5:
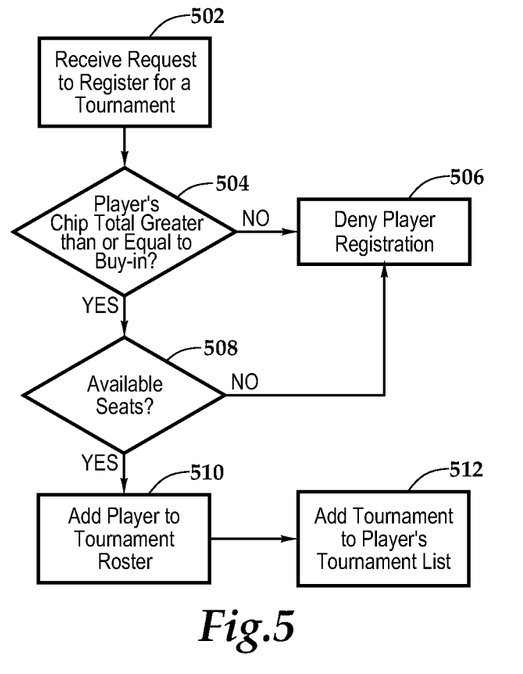
FIG. 5 shows a flowchart for an exemplary process for registering for a tournament.

Referring to FIG. 5, a flowchart for an exemplary tournament registration process is shown. Upon selection of the registration button 416 (FIG. 4*a*), a request to register for a tournament may be sent to and received by the server 40 at step 502. The server 40 may determine if the player's chip total is greater than or equal to the buy-in amount at step 504. If it is not, the registration may be denied at step 506. If the player's chip total is greater than or equal to the tournament buy-in, the server 40 next may determine if the tournament contains available seats at step 508. If there are available seats, the server 40 may add the player to the tournament at step 510 and add the tournament to the player's games list at step 512. If the registration is successful, the user may be informed via a message provided in a pop-up window 440 as shown in the exemplary screenshot 400*d* shown in FIG. 4*d*.

Rejoining A Tournament In Progress

Figure 6:
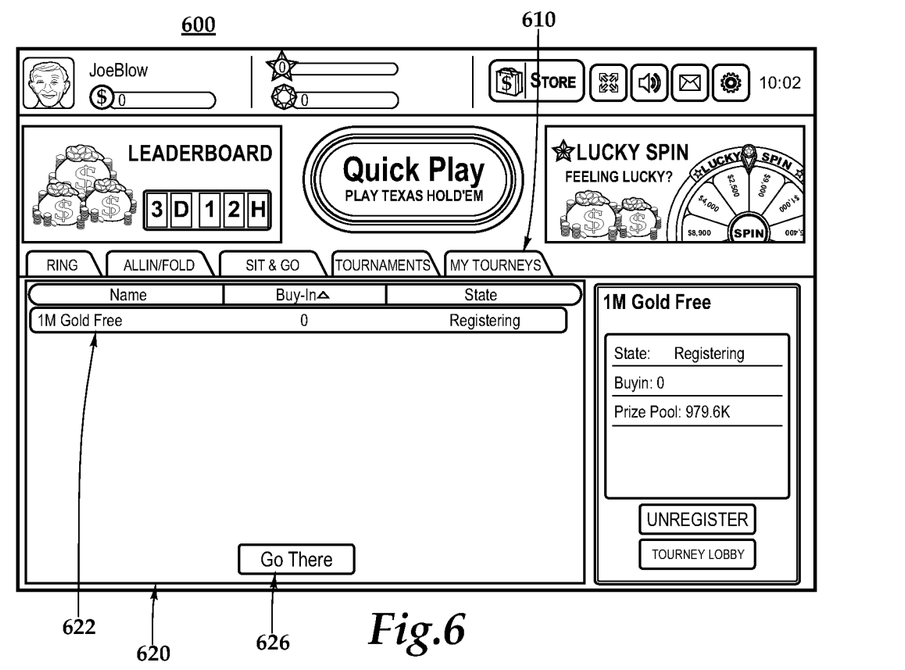
FIG. 6 shows an exemplary screenshot for a games list that provides direct access to a game in progress.

Referring to FIG. 6, an exemplary screenshot 600 for a games list that provides direct access to a game in progress is shown. In contrast to the general tournament list 222, which may include hundreds of tournaments, the games list 622 includes only those tournaments for which the player is registered. In other embodiments, the games list may include other types of extended play game types, such as game types that are played over multiple hands. The games list 622 may be accessible from the main lobby by selecting a corresponding tab 610 and may display tournaments in progress at the top of the list 622. The games list 622 also may include an interface control 626 that may directly seat the player at their table in the selected tournament.

This aspect of the games list 622 is particularly helpful when a player attempts to recover from a network disruption that causes the player to lose their connection to the game server 40. Because of the multi-player nature of a poker tournament, the tournament may not stop if a player is disconnected or voluntarily leaves the table. Instead, the server 40 may place minimum bets for a player not currently seated at their assigned table, such as required blinds and/or antes. By utilizing the games list 622, the system 10 may reduce network traffic because the server is only required to transmit information for the subset of tournaments for which the player is registered. In addition, client side processing efficiency also is increased because the smaller games list uses less memory. As a result of the direct access to a tournament provided by the games list, a disconnected player is able to recover from a network disruption faster.

Creating A Tournament

Figure 7:
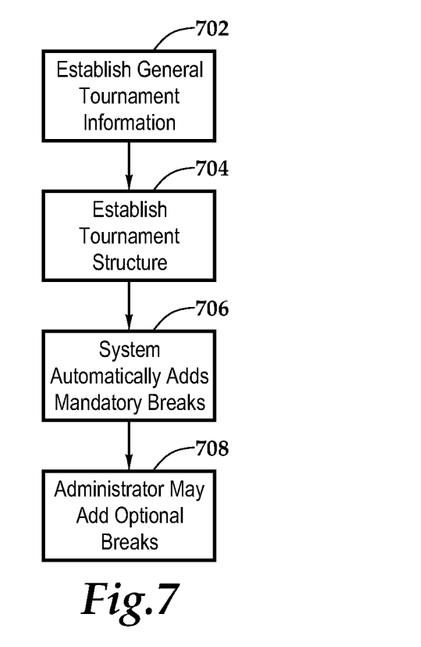
FIG. 7 shows a flowchart of an exemplary process for creating a tournament.
Figure 8:
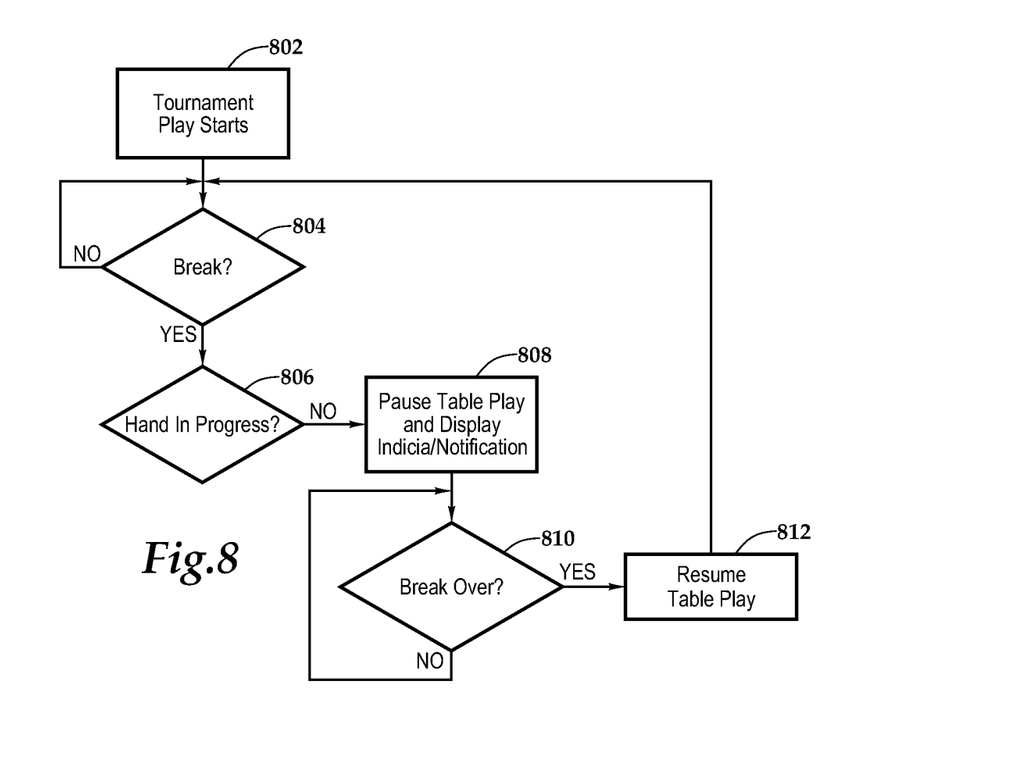
FIG. 8 shows a flowchart of an exemplary process for implementing a break in a game.
Figure 9A:
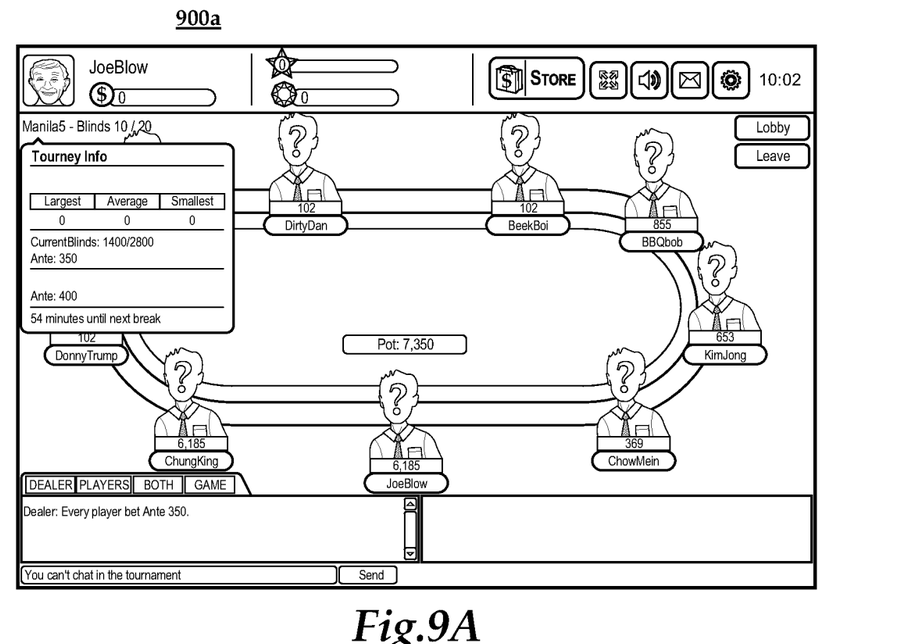
FIGS. 9*a*-*c* show exemplary screenshots of a break during a tournament in progress.
Figure 9B:
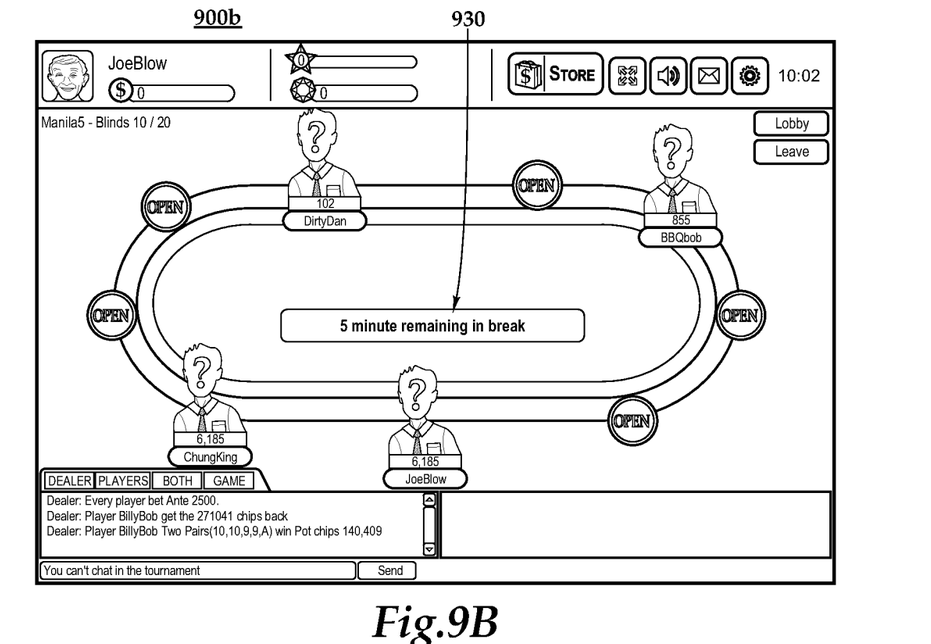
Figure 9C:
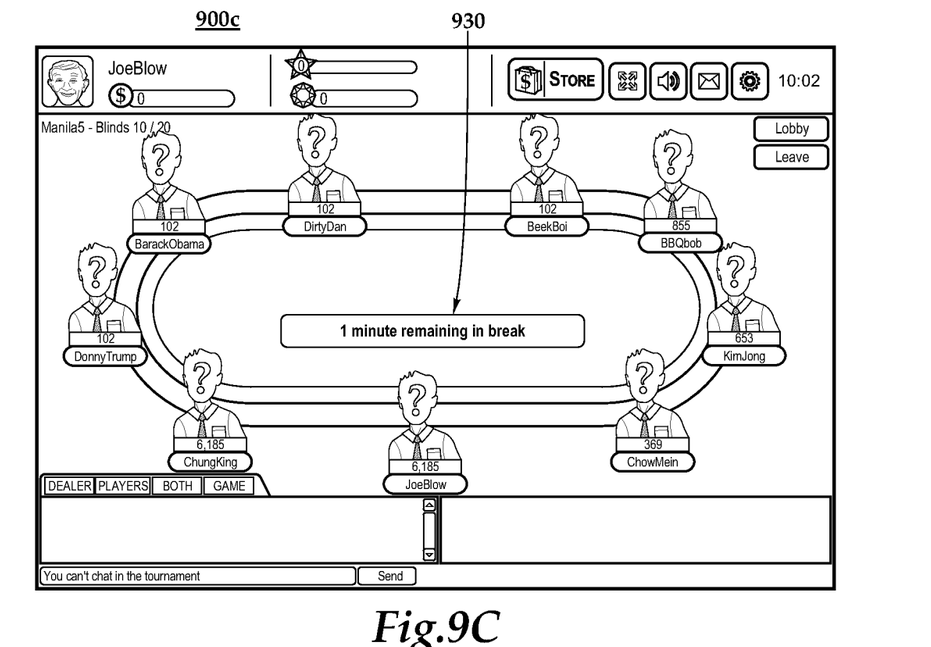

Referring to FIG. 7, a flowchart of an exemplary process for creating a tournament is shown. An administrator may begin the tournament creation process by first establishing general information for the tournament at step 702. General information may include, for example, a title and start time for the tournament as well as other information. Next, the tournament structure may be established at step 704. The tournament structure may include a number of tournament entries, prize pool, payout schedule, number of rounds, blind and ante requirement for each round and the like. Next, the system may automatically add one or more mandatory breaks at step 706. In some embodiments, mandatory breaks may be synchronized across all tournaments such that all tournaments in progress pause for a set duration at a pre-determined time. For example, a mandatory break may be enforced for a five minute interval during the last five minutes of the hour. In other embodiments, mandatory breaks may be at different times and/or have different durations for different types that are required. Finally, the administrator may choose to add one or more additional optional breaks at step 708.

Breaks in Tournament Play

Referring to FIGS. 8 and 9a-c, a flowchart of an exemplary process for implementing a break in a tournament is shown. Tournament play may begin at step 802 and as shown in the exemplary screenshot 900a shown in FIG. 9a. The system may periodically check if a break is scheduled at step 804. For example, the system may check for a break once every minute or at another interval. If a break is scheduled, the system may determine if a hand is currently in progress at the table at step 806. If so, the system may wait until the hand is over. If there is no hand in progress or if the hand finishes, the system may pause play at the table and display indicia indicating that the game is in a break at step 808. The indicia may be a pop-up window indicating that the game is currently on a break and also may include additional information such as the time remaining in the break and the like. In the exemplary screenshot 900b illustrated in FIG. 9b, indicia 930 indicates that there are 5 minutes remaining in the break. The system may continue to monitor if there is time remaining in the break at step 810. Optionally, the system may update the indicia to indicate the current time remaining, as shown in the exemplary screenshot 900c shown in FIG. 9c in which indicia 930 now shows one minute remaining in the break. Once the break is over, the system may resume play at the table at step 812.

Thus, a system for reducing the impact of network disruptions in an electronic game may comprise a first software module for use on a first device comprising one or more processors and one or more memories and a second software module for use on the server computer comprising one or more processors and one or more memories. The first software module may include instructions stored on a non-transitory computer readable medium that: transmit, to a server computer, a request to register a player in an extended play game; request, from the server, a list of extended play games for which the player is registered; display the list; and provide a user interface control that, upon selection by the user, causes the user to be directly seated in one of the extended play games on the list. The second software module may include instructions stored on a non-transitory computer readable medium that: create, for each player, the list of extended play games for which the user is registered; receive the request from the first device; register the player in the extended play game; and add the extended play game to the list.

The extended play game may be a poker tournament.

The list may display extended play games in progress at the top of the list.

The extended play game may include one or more mandatory breaks.

Every extended play game offered by the system may include at least one mandatory break.

At least one mandatory break for each of the extended play games offered by the system may be synchronized to begin at the same time.

At least one mandatory break may be scheduled for the last five minutes of every hour.

The second software module may further include instructions stored on a non-transitory computer readable medium that: determine if a mandatory break is scheduled for a table; determine if a hand is in progress at the table; and pause play at the table if a mandatory break is scheduled and there is no hand in progress at the table.

The first software module may further includes instructions stored on a non-transitory computer readable medium that: display indicia indicating that the extended play game is on a break when play at the table is paused.

The indicia may include a time remaining in the break.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for increasing speed at which a disconnected player is returned to an ongoing electronic wagering game after a network disruption and increasing efficiency in network communications and client- and server-side processing, comprising:
   a first software module for use on a first device comprising one or more processors and one or more memories, the first software module including instructions stored on a non-transitory computer readable medium that expedites access to a wagering game in progress by:
   requesting, from a server computer in response to the disconnected player logging in, a list of extended play games for which the disconnected player is registered;
   displaying the list, wherein the list displays extended play games in progress at the top of the list;
   providing a user interface control that, upon selection of one of the extended play games on the list by the disconnected player, causes the disconnected player to be directly seated in the selected one of the extended play games on the list; and
   a second software module for use on the server computer comprising one or more processors and one or more memories, the second software module including instructions stored on a non-transitory computer readable medium that expedites access to a game in progress by:
   creating, for each player, the list of extended play games for which the disconnected player is registered, thereby expediting selection and access to said game in progress.

2. The system of claim 1, where the selected one of the extended play games is a poker tournament.

3. The system of claim 1, where the list displays extended play games organized according to a status of each extended play game.

4. The system of claim 1, where the selected one of the extended play games includes one or more mandatory breaks.

5. The system of claim 4, where every extended play game offered by the system includes at least one mandatory break.

6. The system of claim 5, where the at least one mandatory break for each of the extended play games offered by the system are synchronized to begin at the same time.

7. The system of claim 6, where the at least one mandatory break is scheduled for the last five minutes of every hour.

8. The system of claim 5, where the second software module further includes instructions stored on a non-transitory computer readable medium that:
   determine if a mandatory break is scheduled for a table;
   determine if a hand is in progress at the table; and pause play at the table if a mandatory break is scheduled and there is no hand in progress at the table.

9. The system of claim 8, where the first software module further includes instructions stored on a non-transitory computer readable medium that:
display indicia indicating that the extended play game is on a break when play at the table is paused.

10. The system of claim 9, where the indicia includes a time remaining in the break.

11. The system of claim 1, where the first software module further includes instructions stored on the non-transitory computer readable medium that:
transmit, to the server computer, a request to register a player in an extended play game;
and the second software module further includes instructions stored on the non-transitory computer readable medium that:
receive the request to register from the first device;
register the player in the extended play game; and
add the extended play game to the list of extended play games for which the player is registered.

\* \* \* \* \*